(12) United States Patent
Mankame et al.

(10) Patent No.: US 10,023,239 B2
(45) Date of Patent: Jul. 17, 2018

(54) LOCAL ENERGY ABSORBER

(71) Applicant: GM GLOBAL TECHNOLOGY OPERATIONS LLC, Detroit, MI (US)

(72) Inventors: Nilesh D. Mankame, Ann Arbor, MI (US); Hanif Muhammad, Ann Arbor, MI (US); Louis G. Hector, Jr., Shelby Township, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/173,149

(22) Filed: Jun. 3, 2016

(65) Prior Publication Data
US 2016/0280280 A1 Sep. 29, 2016

Related U.S. Application Data

(62) Division of application No. 14/539,132, filed on Nov. 12, 2014, now Pat. No. 9,381,879.

(51) Int. Cl.
*B60K 7/00* (2006.01)
*B62D 25/12* (2006.01)
(Continued)

(52) U.S. Cl.
CPC ............ *B62D 25/12* (2013.01); *B60R 19/023* (2013.01); *B60R 19/03* (2013.01); *B60R 19/18* (2013.01);
(Continued)

(58) Field of Classification Search
CPC ........ B62D 25/10; B60K 11/08; B60K 13/02; E05Y 2900/536; F02M 35/161;
(Continued)

(56) References Cited

U.S. PATENT DOCUMENTS 3,820,163 A 6/1974 Rappleyea
4,029,350 A 6/1977 Goupy et al.
(Continued)

FOREIGN PATENT DOCUMENTS

CN 201567744 U 9/2010
CN 105752166 A 7/2016
(Continued)

OTHER PUBLICATIONS

Kerkeling, Christoph, et al., "Structural Hood and Hinge Concepts for Pedestrian Protection", 11 pages, http://www-nrd.nhtsa.dot.gov/pdf/esv/esv19/05-0304-w.pdf.
(Continued)

*Primary Examiner* — Kiran B Patel
(74) *Attorney, Agent, or Firm* — Harness, Dickey & Pierce, P.L.C.

(57) ABSTRACT

A vehicle hood covering an underhood object includes an inner surface of the vehicle hood facing the underhood object and spaced from the underhood object, and an outer surface of the vehicle hood opposite the inner surface. A local energy absorber is operatively attached to the inner surface of the vehicle hood. The local energy absorber is a multiply-connected structure. The local energy absorber includes a wall defining an interior surface having symmetry about a central plane normal to the inner surface of the vehicle hood. A plurality of apertures is defined in the wall symmetrically about the central plane to initiate buckling and fracture in the wall during an impact applied to the outer surface defining an impact event having a duration of less than 20 milliseconds.

14 Claims, 9 Drawing Sheets

(51) Int. Cl.
  *B62D 25/10* (2006.01)
  *F16F 7/12* (2006.01)
  *B60R 21/34* (2011.01)
  *B60R 19/02* (2006.01)
  *B60R 19/03* (2006.01)
  *B60R 19/18* (2006.01)

(52) U.S. Cl.
  CPC ............ B60R 21/34 (2013.01); B62D 25/105 (2013.01); F16F 7/12 (2013.01); *B60R 2019/182* (2013.01); *B60R 2021/343* (2013.01)

(58) Field of Classification Search
  CPC .............. B60R 21/34; B60R 2021/343; B60R 21/0136; B60R 19/483; B60R 2019/186
  USPC ..................................................... 296/187.03
  See application file for complete search history.

(56) References Cited

U.S. PATENT DOCUMENTS

| | | | |
|---|---|---|---|
| 4,035,539 A * | 7/1977 | Luboshez | B32B 3/28 359/580 |
| 4,476,820 A * | 10/1984 | Nixon | B60K 11/00 123/195 C |
| 4,635,981 A | 1/1987 | Friton | |
| 5,290,622 A * | 3/1994 | Tanabe | B32B 3/28 296/211 |
| 5,791,118 A * | 8/1998 | Jordan | B32B 3/28 428/184 |
| 6,048,022 A * | 4/2000 | Ishibashi | B62D 21/15 180/69.2 |
| 6,179,364 B1 * | 1/2001 | Takahashi | B62D 25/105 296/191 |
| 6,848,738 B2 | 2/2005 | Kempf et al. | |
| 6,939,599 B2 * | 9/2005 | Clark | B32B 3/30 428/178 |
| 7,017,969 B1 * | 3/2006 | Kirkham | B60R 13/011 296/39.1 |
| 7,114,765 B2 | 10/2006 | Ishikawa et al. | |
| 7,140,673 B2 | 11/2006 | Ito et al. | |
| 7,147,273 B2 | 12/2006 | Ikeda et al. | |
| 7,354,101 B2 | 4/2008 | Donabedian et al. | |
| 7,399,028 B1 | 7/2008 | Castillo et al. | |
| 7,467,680 B2 * | 12/2008 | Mason | B60R 21/34 180/69.2 |
| 7,488,031 B2 * | 2/2009 | Ishitobi | B60R 21/34 296/187.04 |
| 7,578,548 B2 | 8/2009 | Behr et al. | |
| 7,635,157 B2 | 12/2009 | Wang et al. | |
| 7,690,720 B2 | 4/2010 | Wang et al. | |
| 7,735,908 B2 | 6/2010 | Wang et al. | |
| 7,984,943 B2 * | 7/2011 | Iwano | E05B 77/08 296/187.04 |
| 7,988,222 B2 * | 8/2011 | Fujimoto | B60R 21/34 296/187.04 |
| 7,997,642 B2 | 8/2011 | Rocheblave et al. | |
| 8,052,198 B2 | 11/2011 | Seksaria et al. | |
| 8,356,857 B2 | 1/2013 | Ralston et al. | |
| 8,485,588 B1 * | 7/2013 | Voss | F16F 1/025 180/69.2 |
| 8,726,613 B2 | 5/2014 | Rhee et al. | |
| 8,991,902 B2 * | 3/2015 | Wisniewski | B62D 25/12 296/187.04 |
| 9,089,180 B2 | 7/2015 | Phipps et al. | |
| 9,107,466 B2 | 8/2015 | Hoying et al. | |
| 9,116,428 B1 | 8/2015 | Jacobsen et al. | |
| 9,376,074 B2 | 6/2016 | Hundley et al. | |
| 9,381,879 B2 | 7/2016 | Mankame et al. | |
| 9,405,067 B2 | 8/2016 | Yang et al. | |
| 9,718,434 B2 | 8/2017 | Hector, Jr. et al. | |
| 2004/0262952 A1 * | 12/2004 | Kempf | B60R 21/34 296/187.04 |
| 2005/0082875 A1 * | 4/2005 | Ikeda | B60R 21/34 296/193.11 |
| 2005/0088016 A1 * | 4/2005 | Ito | B60R 21/34 296/193.11 |
| 2006/0006698 A1 * | 1/2006 | Ishikawa | B62D 25/105 296/193.11 |
| 2006/0220418 A1 * | 10/2006 | Behr | B60R 21/34 296/187.04 |
| 2007/0132279 A1 * | 6/2007 | Donabedian | B62D 25/105 296/193.11 |
| 2008/0088154 A1 * | 4/2008 | Rocheblave | B60R 21/34 296/187.04 |
| 2008/0122261 A1 * | 5/2008 | Seo | B62D 25/105 296/193.11 |
| 2009/0025995 A1 * | 1/2009 | Wang | B62D 25/105 180/69.2 |
| 2009/0026807 A1 * | 1/2009 | Wang | B60R 21/34 296/193.11 |
| 2009/0065277 A1 * | 3/2009 | Wang | B62D 25/105 180/69.2 |
| 2009/0195020 A1 * | 8/2009 | Wang | B62D 25/105 296/187.09 |
| 2010/0140979 A1 * | 6/2010 | Seksaria | B62D 25/105 296/193.11 |
| 2010/0258988 A1 | 10/2010 | Darnell et al. | |
| 2011/0070458 A1 | 3/2011 | Quan et al. | |
| 2011/0214932 A1 * | 9/2011 | Ralston | B60R 21/34 180/274 |
| 2012/0211297 A1 * | 8/2012 | Ralston | B60R 21/34 180/274 |
| 2015/0047113 A1 | 2/2015 | Stringfellow et al. | |
| 2015/0307044 A1 * | 10/2015 | Hundley | B60R 19/18 293/120 |
| 2016/0280280 A1 | 9/2016 | Mankame et al. | |
| 2017/0188650 A1 | 7/2017 | Hector, Jr. et al. | |

FOREIGN PATENT DOCUMENTS

| | | |
|---|---|---|
| CN | 106945728 A | 7/2017 |
| DE | 102015119021 A1 | 5/2016 |
| DE | 102017200019 A1 | 7/2017 |
| WO | WO-2014137924 A1 | 9/2014 |

OTHER PUBLICATIONS

Q. Liu, Y. Xia, Q. Zhou, J.-T. Wang, "Design Analysis of a Sandwich Hood Structure for Pedestrian Protection," Paper No. 09-0356, Proceedings of 21th International Technical Conference on the Enhanced Safety of Vehicles (ESV), Stuttgart, Germany (Jun. 15-18, 2009), 7 pages.

Paik, Jeom Kee, et al., "The strength characteristics of aluminum honeycomb sandwich panels," Thin-Walled Structures 25, (1999), pp. 205-231.

First Office Action for Chinese Application No. 201511036185.2 dated Jul. 4, 2017 with English translation; 11 pages.

* cited by examiner

LOCAL ENERGY ABSORBER

CROSS-REFERENCE TO RELATED APPLICATION

This application is a divisional of co-pending U.S. application Ser. No. 14/539,132, filed Nov. 12, 2014, which is incorporated by reference herein in its entirety.

BACKGROUND

Some automobiles and other vehicles have a hood or bonnet, which is the hinged cover that allows access to the engine compartment for maintenance and repair. In many vehicles, but not all vehicles, the hood or bonnet is on the front of the vehicle, relative to the forward direction of travel.

SUMMARY

A vehicle hood covering an underhood object includes an inner surface of the vehicle hood facing the underhood object and spaced from the underhood object, and an outer surface of the vehicle hood opposite the inner surface. A local energy absorber is operatively attached to the inner surface of the vehicle hood. The local energy absorber is a multiply-connected structure. The local energy absorber includes a wall defining an interior surface having symmetry about a central plane normal to the inner surface of the vehicle hood. A plurality of apertures is defined in the wall symmetrically about the central plane to initiate buckling and fracture in the wall during an impact applied to the outer surface defining an impact event having a duration of less than 20 milliseconds.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
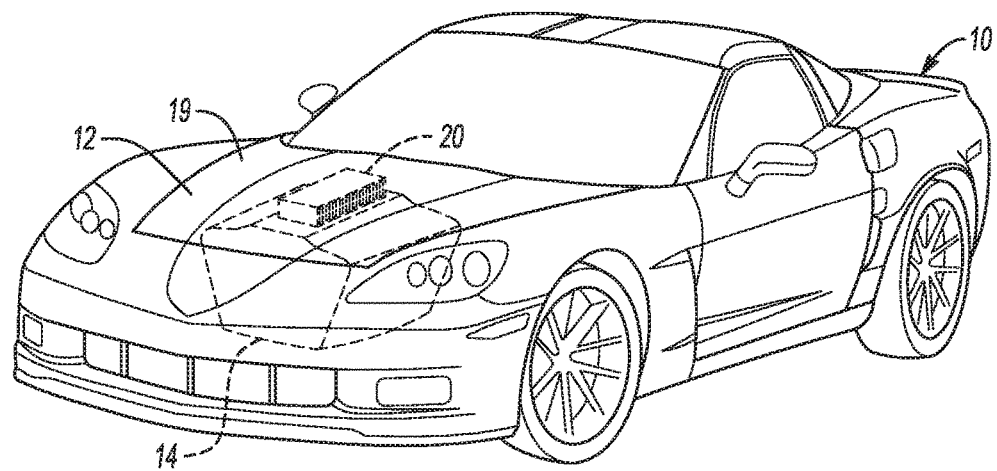
FIG. 1 is a semi-schematic, perspective view of a vehicle having a local energy absorber under a hood according to the present disclosure.
Figure 2A:
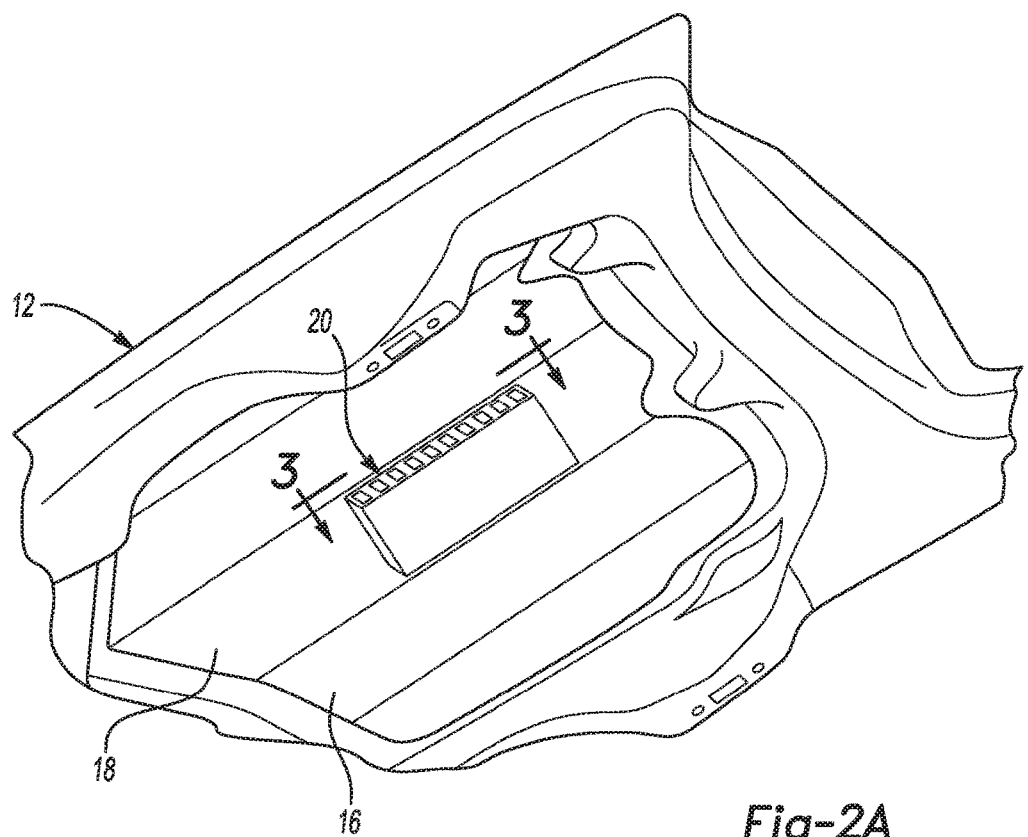
FIG. 2A is a semi-schematic, perspective view of the underside of the hood shown in FIG. 1, showing the local energy absorber of the present disclosure.
Figure 3:
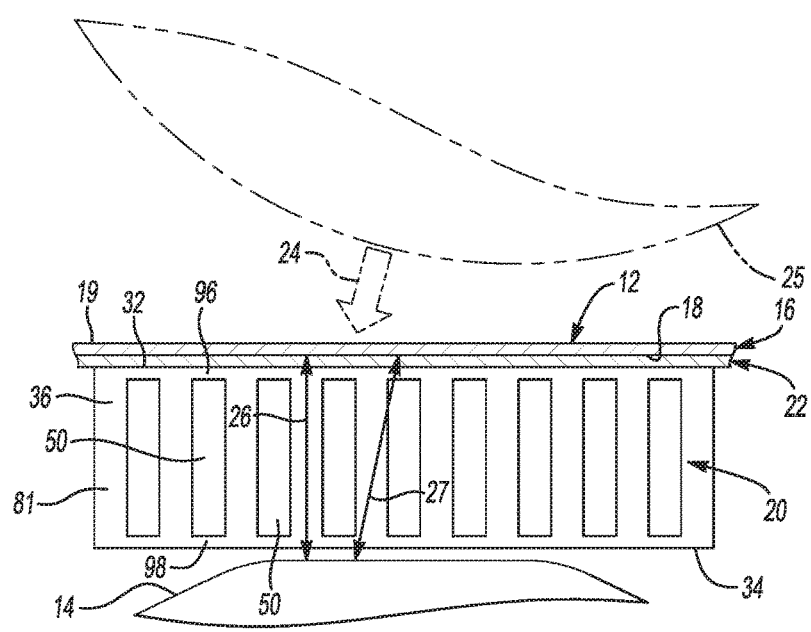
FIG. 3 is a semi-schematic, cross-sectional view taken substantially along line 3-3 of FIG. 2A.

FIG. 1 is a semi-schematic, perspective view of an example of a vehicle 10 according to the present disclosure. An underhood object 14 is shown in dashed lines. The underhood object 14 represents components within the engine compartment below the hood 12. FIG. 2A shows the underside of the hood 12, and FIG. 3 shows a cross-sectional view taken substantially along line 3-3 of FIG. 2A. The vehicle hood 12 is generally illustrative of the forward region or the hood region of the vehicle 10. The vehicle 10 is shown for illustrative purposes and demonstrates only one possible environment into which the components described herein may be incorporated. The underhood object 14 may be, for example and without limitation, an engine, a battery, a supercharger, a sway bar, a fluid fill port cap, or combinations thereof. As used herein, the term "rigid" is not used in an ideal sense, but represents relatively hard objects, or relatively heavy objects, that may provide a reactive force to an impacting object.

While the present disclosure is described in detail with respect to automotive applications, those skilled in the art will recognize the broader applicability of the disclosure. Those having ordinary skill in the art will recognize that terms such as "above," "below," "upward," "downward," etc., are used descriptively of the figures, and do not represent limitations on the scope of the present disclosure. Any numerical designations, such as "first" or "second" used are not intended to be limiting, and any specific component may be referenced with any number unless specifically stated herein.

The vehicle hood 12 includes a hood panel 16 having an inner surface 18 facing the underhood object 14 and an outer surface 19 opposite the inner surface 18. A local energy absorber 20 is operatively attached to the inner surface 18 of the hood panel 16 of the vehicle hood 12, such as through a bond 22. In other examples, the local energy absorber 20 may be attached by, rivets, snap fits, or fasteners (not shown). The local energy absorber 20 is a multiply-connected structure, and is attached to the hood panel 16 adjacent to the underhood object 14.

Figure 2B:
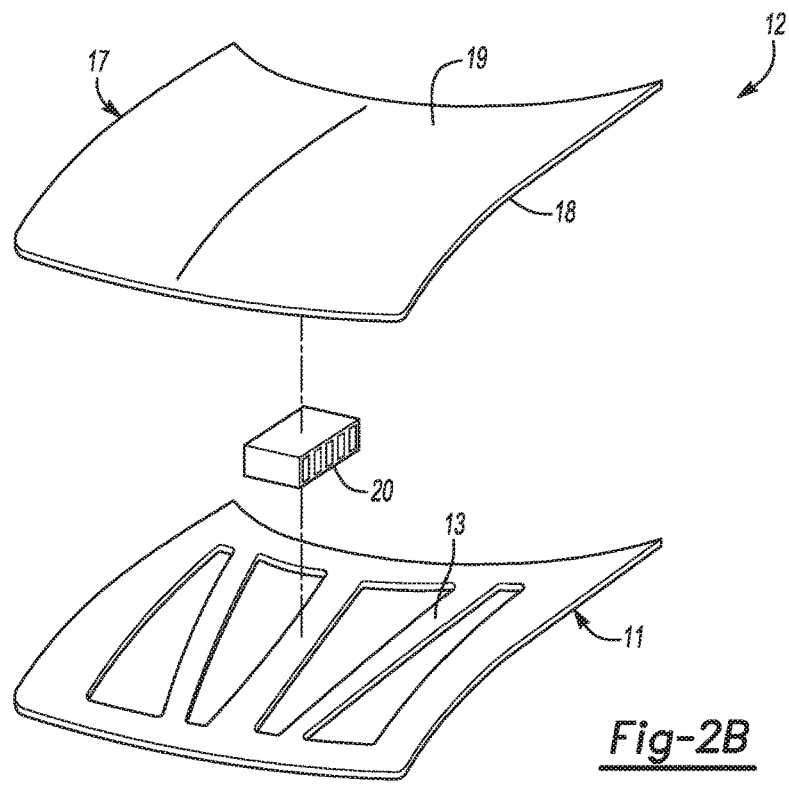
FIG. 2B is a semi-schematic, perspective exploded view of a hood with a hood inner panel, a hood outer panel, and a local energy absorber disposed therebetween.

The bond 22 may be, for example and without limitation, an adhesive bond or a welded bond. The local energy absorber 20 may be attached to the inner surface 18, or disposed between the inner surface 18 and the underhood object 14 in the engine compartment of the vehicle 10. In some vehicles 10, the hood 12 may include a hood outer panel 17, and a hood inner panel 11. The hood outer panel 17 may have the outer surface 19, which is the surface that is visible from outside the vehicle 10 (see FIG. 1) when the hood 12 is in a closed position as shown in FIG. 1. The hood inner panel 11 may have a supporting rib structure 13 as depicted in FIG. 2B. In the example depicted in FIG. 2B, the local energy absorber 20 may be operatively attached to the inner surface 18 by positioning the local energy absorber 20 between a hood inner panel 11 and the hood outer panel 17. When disposed between the hood inner panel 11 and the hood outer panel 17, the local energy absorber 20 may be placed on edge supports (not shown) to receive the local energy absorber 20 so that a portion of the absorber is unsupported except for contact around the outer edges to prevent the local energy absorber 20 from slipping away from the mounting location.

In some vehicles 10, the local energy absorber 20 may be attached to the inner surface 18 indirectly. For example, the hood inner panel 11 may intervene between the local energy absorber 20 and the inner surface 18. In such an example, the local energy absorber 20 is attached to the inner surface 18 via the hood inner panel 11.

The multiply-connected structure or multiply-connected body of the local energy absorber 20 is configured to absorb energy delivered by an impact load 24 to the outer surface 19 of the hood 12, such as from an impacting object 25. The impact load 24 is represented as an arrow, and is illustrative only. The direction and type of impact may vary and the impacting object 25 causing the impact load 24 may vary.

The inner surface 18 of the hood panel 16 is spaced from the underhood object 14 by a basin depth 26. The basin depth 26 may be defined or measured in different ways. In FIG. 3, the basin depth 26 is shown as the shortest absolute distance between the inner surface 18 and the underhood object 14. However, an alternative measurement may be made along a line substantially parallel to the expected direction of the impact load 24, which is shown as alternative basin depth 27.

If the local energy absorber 20 were not attached to the hood panel 16, the impact load 24 may cause the hood panel 16 to deform until the hood panel 16 crosses the basin depth 26 and makes contact with the underhood object 14. However, the local energy absorber 20 is to deform and dissipate energy from the impact load 24 before the hood panel 16 (or the hood inner panel 11) makes contact with the underhood object 14, thereby reducing the force applied by impact with the underhood object 14. The way in which the local energy absorber dissipates the impact load 24 may be quantified using Eq. 1 below. Without the local energy absorber 20, the peak loads experienced by the impacting object 25 are higher and less energy is absorbed (by the hood 12) as the impacting object 25 passes through the basin depth 26 with the hood 12 between the impacting object 25 and the underhood object 14.

$$\left\{(t_2 - t_1)\left[\frac{1}{t_2 - t_1}\int_{t_1}^{t_2} a(t)\,dt\right]^{2.5}\right\}_{max} \quad \text{Eq. 1}$$

In Eq. 1, $t_1$ and $t_2$ are the initial and final times (in seconds) of a time interval during which Eq. 1 attains a maximum value, and deceleration a is in units of gs (1 standard g=9.81 meters per second squared). The maximum time duration $(t_2-t_1)$ may be limited to a specific value ranging from about 3 ms to about 36 ms (milliseconds). For example, the maximum time duration may be about 20 ms.

In experimental tests, Eq. 1 is evaluated from the deceleration and time history of at least one accelerometer mounted at the center of gravity of the impacting object 25 when the impacting object 25 is impacted into the hood panel 16. Eq. 1 evaluates the effects of the deceleration on the impacting object 25 and the duration time of the deceleration. In some computer models that predict a value of Eq. 1 for an impact scenario, higher scores result from either: short impact duration times at larger maximum decelerations, or longer impact duration times at smaller maximum decelerations. For a given basin depth 26, the local energy absorber 20 of the present disclosure is to minimize or reduce the value of Eq. 1 for a particular impact scenario. Alternatively, the local energy absorber 20 may achieve a target value of Eq. 1 for a particular impact scenario while minimizing the basin depth 26.

Figure 4A:
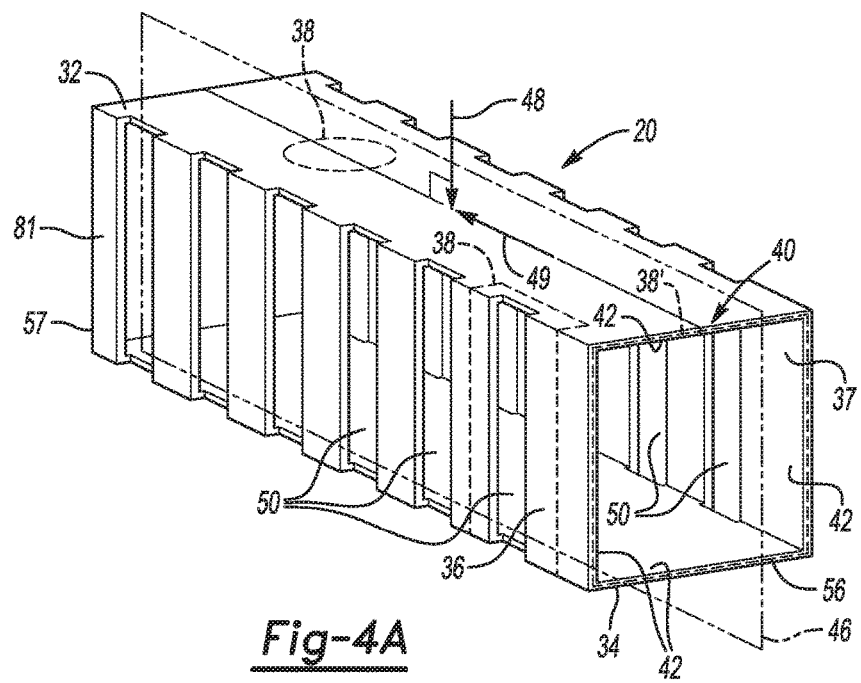
FIG. 4A is a semi-schematic, perspective view of the local energy absorber depicted in FIG. 3.

Referring to FIG. 4A, the local energy absorber 20 is a multiply-connected structure, including a wall 40 defining an interior surface 42 having symmetry about a central plane 46 normal to the inner surface 18 of the vehicle hood 14. A plurality of apertures 50 is defined in the wall 40 symmetrically about the central plane 46 to initiate buckling and fracture in the wall 40 during an impact applied to the outer surface 19. In examples, the impact defines an impact event having a duration of less than 20 ms. In other examples, the impact event may have a longer or shorter duration.

As used herein, the term "singly-connected structure" refers to structures or bodies in which any mathematical circuit 38 drawn within a cross section of the body can be reduced to a single mathematical point. The mathematical circuit 38 is a closed, continuous curve, and a mathematical point has no dimension and can be referenced only by its location. As the mathematical circuit 38 is reduced to smaller and smaller circuits, it will eventually converge to a point. In the present context, singly-connected bodies or structures may also be referred to as open-shell structures. In a singly-connected structure, every closed curve or mathematical circuit 38 within the cross-section can be capped with a closed surface, i.e., a surface without any holes.

In sharp contrast, a single mathematical circuit within "multiply-connected structures" cannot be reduced to a single point. Similarly, mathematical circuits of multiply-connected structures cannot be capped by closed surfaces. As a general rule, multiply-connected structures have holes in them, while singly-connected structures do not.

As used herein, a structure may be singly-connected in first cross-sections transverse to a first direction 48, and multiply-connected in second cross-sections transverse to a second direction 49 orthogonal to the first direction 48. FIG. 4A depicts a mathematical circuit 38' in an example of the second cross-section transverse to the second direction 49. The mathematical circuit 38' is prevented from being reduced to a point by the opening defined by interior surface 42. In examples of the present disclosure, the first direction may be normal to the inner surface 18 of the vehicle hood 12, and the first direction may lie in the central plane 46. The second direction 49 may be orthogonal to the first direction 48 and the second direction 49 may also lie in the central plane 46. In examples of the present disclosure, the local energy absorber 20 is multiply-connected in the first cross-sections transverse to the first direction 48 normal to the inner surface 18.

Illustrative examples of basic, cross-sectional shapes that are singly connected include, without limitation: C-shapes, S-shapes, or U-shapes. Illustrative examples of cross-sectional shapes that are multiply connected include, without limitation: ovals, boxes, and figure eights. The mathematical topology of multiply-connected structures renders their structural response during impact completely different from the structural response of singly-connected bodies. In examples of the present disclosure, the multiply-connected structure is advantageous in that it directly affects energy absorption on the local energy absorber 20 causing Eq. 1 to yield a lower result.

In the example depicted in FIGS. 1-4A, the wall 40 includes a planar top portion 32 normal to the central plane 46. A planar bottom portion 34 is parallel to the top portion 32 and spaced from the top portion 32. A planar first side portion 36 is defined between the top portion 32 and the bottom portion 34. A planar second side portion 37 is parallel to the first side portion 36. The planar top portion 32 is operatively attached to the inner surface 18 of the vehicle hood 12. The apertures 50 are defined in the first side portion 36 and the second side portion 37. The apertures 50 may define a header 96 (e.g. see FIG. 3) on the first side portion 36 and the second side portion 37 such that header 96 prevents the apertures 50 from being defined in the intersection of the planar top portion 32 and the first side portion 36 or the second side portion 37. In the examples depicted in FIGS. 4A-4D, there is no header 96, and the apertures 50 are defined through the intersection of the planar top portion 32 and the first side portion 36. Similarly, the apertures 50 are defined through the intersection of the planar top portion 32 and the second side portion 37 in FIGS. 4A-4D.

Similarly, the apertures 50 may define a footer 98 on the first side portion 36 and the second side portion 37 such that footer 98 prevents the aperture 50 from being defined in the intersection of the planar bottom portion 34 and the first side portion 36 or the second side portion 37. In the examples depicted in FIGS. 4A-4D, there is no footer 98, and the apertures 50 are defined through the intersection of the planar bottom portion 34 and the first side portion 36. Similarly, the apertures 50 are defined through the intersection of the planar bottom portion 34 and the second side portion 37 in FIGS. 4A-4D.

Figure 4C:
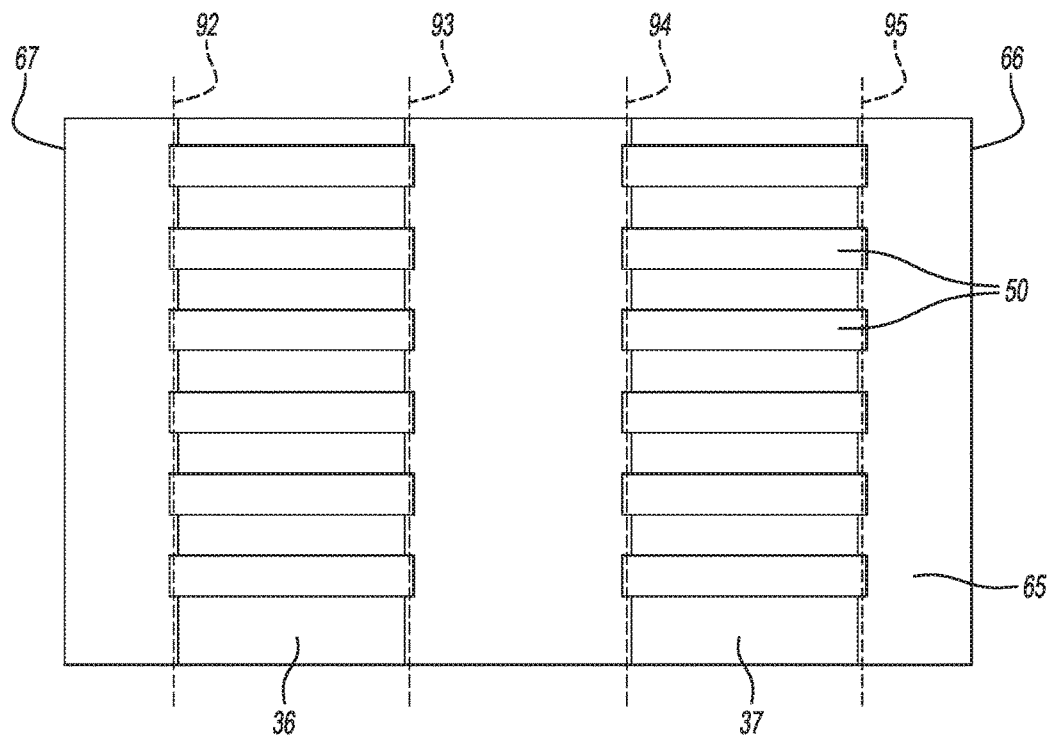
FIG. 4C is a semi-schematic plan view of an example of a single sheet to be folded into the local energy absorber depicted in FIG. 4D.
Figure 4B:
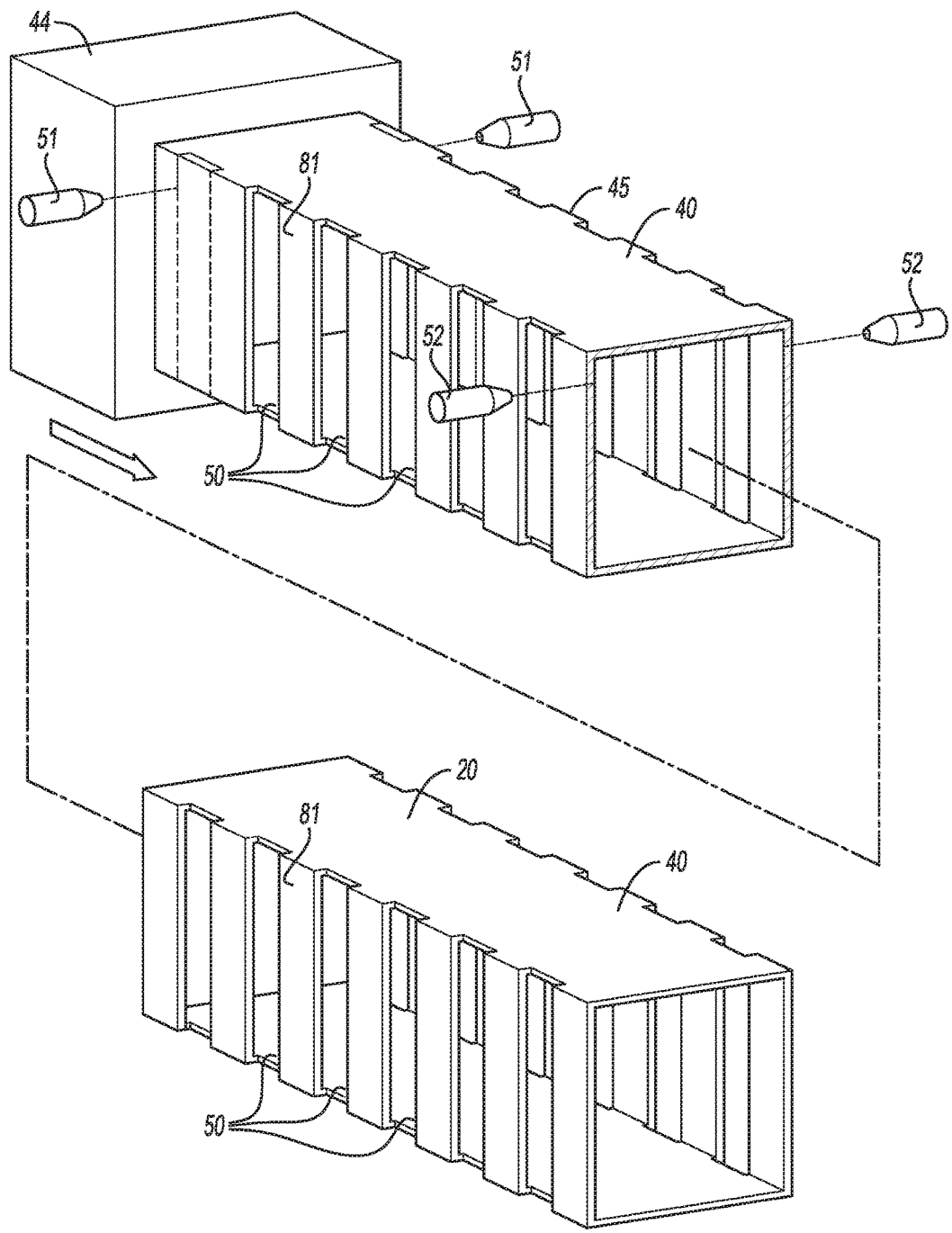
FIG. 4B is a semi-schematic perspective view of examples of the local energy absorber depicting stages of fabrication by extrusion according to the present disclosure.

In examples of the present disclosure depicted in FIG. 4B, the local energy absorber 20 may be fabricated by extruding the wall 40 as a single extrudate 45 through a die 44, then forming the plurality of apertures 50. In an example, the local energy absorber 20 may be formed from a magnesium alloy or an aluminum alloy. The plurality of apertures 50 may be formed by machining, laser cutting, or other metal removal processes as the extrudate 45 exits the die 44 before the local energy absorber 20 is divided from the extrudate 45. In the example depicted in FIG. 4B, a first laser 51 cuts the plurality of apertures 50 into the extrudate 45. A second laser 52 divides the local energy absorber 20 from the extrudate 45. In other examples, another cutting device such as a rotary cutting tool (not shown) may be substituted for the first laser 51 or the second laser 52.

The local energy absorber 20 is shown and described herein on the vehicle hood 12. However, the local energy absorber 20 may also be used to reduce the effects of impacts to objects impacting other exterior panels or portions of the vehicle 10. For example, and without limitation, the local energy absorber 20 may be located adjacent to: fenders, bumpers, or quarter panels. Note also that small holes (not shown) placed in the local energy absorber 20, such as holes in the planar top portion 32 for attachment to the hood panel 16, do not contribute to or detract from the multiply-connected nature of the local energy absorber 20 because the response to impact loading would be substantially unaffected by the small holes.

In the vehicle hood 12 shown in FIGS. 1-3, the planar top portion 32 and the planar bottom portion 34 of the local energy absorber 20 are substantially parallel with each other and the inner surface 18 of the hood panel 16. As used herein, substantially parallel refers to the planar top portion 32 and the planar bottom portion 34 being within fifteen degrees of parallel, plus or minus. However, some examples may be configured with the planar top portion 32 and the planar bottom portion 34 even closer to parallel, such as within five or fewer degrees of parallel.

Figure 5:
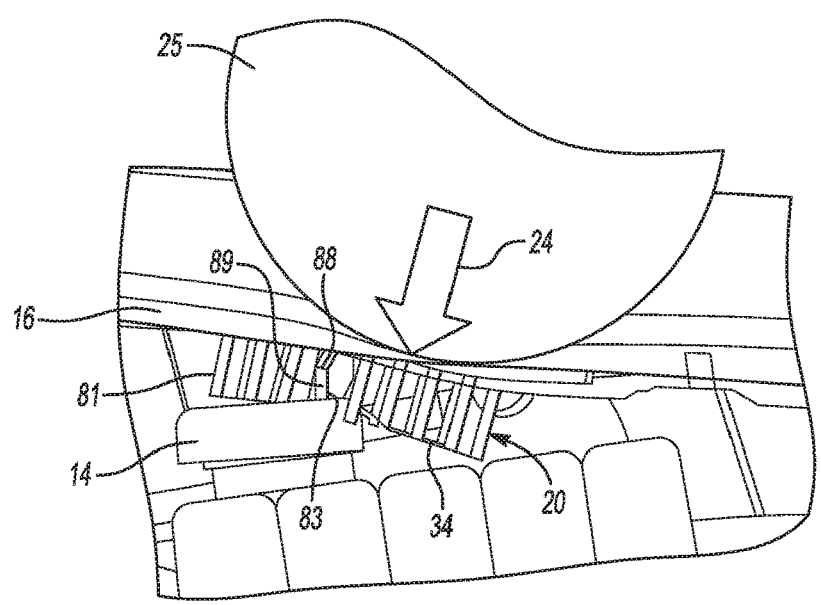
FIG. 5 is a semi-schematic side view depicting an example of an impact event according to the present disclosure.

Under sufficient impact load 24, the hood panel 16 deforms, and the local energy absorber 20 moves from the position shown in FIG. 3 toward the underhood object 14 as depicted in FIG. 5. After the planar bottom portion 34 impacts the underhood object 14, the local energy absorber 20 begins deforming and absorbs some of the energy of the impact load 24.

The multiply-connected structure of the local energy absorber 20 has a different deformation response than a singly-connected structure. Deformation without fracture occurs while the strain and displacement of the structures remain compatible. Structures maintain compatibility of strain and displacement for non-fracture deformation. The conditions for a compatible response to loading are dramatically different for multiply-connected structures and singly-connected structures. Therefore, singly-connected structures and multiply-connected structures respond to loading differently.

Some existing structures are configured to avoid fracture during deformation; however, the multiply-connected structure of the local energy absorber 20 may be configured to fracture (after plastic deformation and buckling) in response to the impact load 24 being above a threshold load. Fractures are violations of compatibility between the strain and displacement within the local energy absorber 20. Compatibility between strain and displacement refers to a continuum description of a solid body in which the solid body is described as being composed of a set of infinitesimal volumes. Each volume is assumed to be connected to its neighbors without any gaps or overlaps. Certain conditions have to be satisfied to ensure that gaps or overlaps do not develop when a continuum body is deformed. A body that deforms without developing any gaps (e.g., cracks) or overlaps is called a compatible body. Compatibility conditions are mathematical conditions that determine whether a particular deformation will leave a body in a compatible state. Before a crack develops, there is a relationship between strain and displacement of the solid body. There is compatibility between strain and displacement. After a crack develops, the previous relationship between strain and displacement is broken, violating the compatibility.

Prior to fracturing, the local energy absorber 20 may absorb energy. Upon fracturing, the local energy absorber dissipates energy from the impact load 24 by opening up new surfaces in a subset 83 of the plurality of struts 81. The accumulation of excess strain energy within the absorber causes a crack to open some time after initial impact, which then dissipates strain energy into fracture propagation. The energy dissipated during fracture further prevents or minimizes high-energy contact between the underhood object 14 and the impacting object 25. The fractures 88 may occur along a strut 89 (see FIG. 5) such that much of the energy dissipated by the local energy absorber 20 is dissipated by the strut 89.

In the local energy absorber 20 shown in FIGS. 1-3, the multiply-connected structure is shown as a metallic material, such as aluminum, magnesium, or alloys thereof. However, the local energy absorber 20 may be formed from other materials, as described herein. For example, the local energy absorber 20 may be formed from a high-temperature polymer. As used herein, a high temperature polymer maintains its properties at temperatures above 150° C. up to 200° C. Examples of high-temperature polymers are polyamides (e.g. Nylon®), polyphenylene sulfide (PPS) and polyethersulfone (PES). The local energy absorber 20 may include a filler material in a high-temperature polymer matrix. The filler material may be fiber, mineral or combinations thereof. For example, the filler material may be carbon fiber, glass fiber, talc, or wollastonite, alone or combined. In examples, fibers may have an aspect ratio of around 20, and a length of about 200 μm to about 300 μm. In other examples, fibers may range in length from about 2 mm to about 5 mm. In still other examples, fibers may range in length from about 10 mm to about 25 mm.

The filler material may increase the strength/ductility of examples of the local energy absorber 20 made from a high-temperature polymer. The filler may decrease the ductility of the high-temperature polymer when the filler is added to the high-temperature polymer matrix. The filler may be added to improve stiffness and strength of the local energy absorber 20. The filler may inhibit crack growth by diverting crack tips and/or blunting crack tips; thereby increasing the energy needed to form new surface area. Ductility of the local energy absorber 20 may be increased by adding the filler. Due to stiffening caused by the filler, it may take more force to reach the strain necessary to start propagating cracks. However, the strain to fracture may decrease due to the strain enhancement caused by the limiting amount of material that can be involved in dispersing the force.

In some configurations of the local energy absorber 20, the plurality of struts 81 moves from elastic deformation into fracture deformation substantially without plastic deformation. This may reduce Eq. 1 resulting from the impact load 24 delivered by the impacting object 25. If the local energy absorber 20 is formed from magnesium or magnesium alloys, the planar first side 36 and the planar second side 37 may move more-directly between elastic and fracture deformation than if the local energy absorber 20 is formed from aluminum. Magnesium alloys may experience very little plastic deformation between elastic deformation and fracture, but usually will experience some plastic deformation.

Figure 4D:
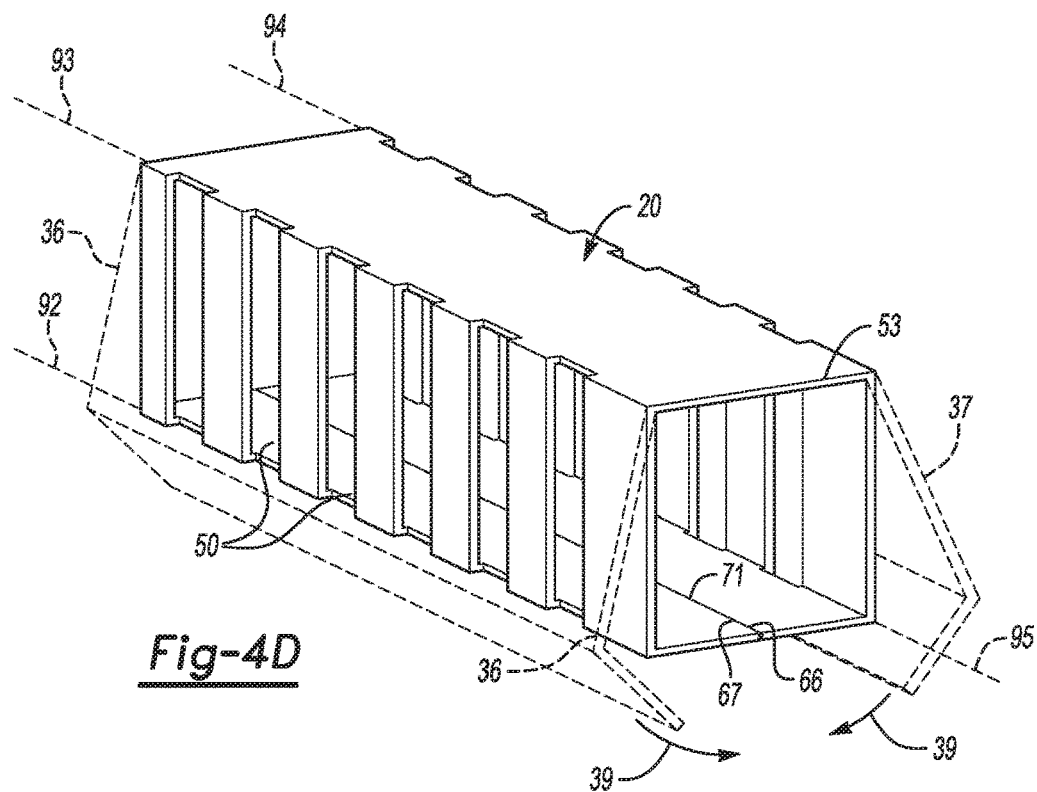
FIG. 4D is a semi-schematic, perspective view of an example of the local energy absorber after the single sheet of FIG. 4C has been folded and permanently joined at the free edges.

In examples of the present disclosure as depicted in FIG. 4C and FIG. 4D, the local energy absorber 20 may be formed by folding a single sheet 65 to form a closed perimeter 53, then permanently joining a first edge 66 of the single sheet 65 to a second edge 67 of the single sheet 65 to form a seam 71 by crimping or welding. FIG. 4C depicts the single sheet 65 as flat before being folded as indicated in FIG. 4D. The single sheet 65 is folded at 90 degrees along the first folding line 92, the second folding line 93, the third folding line 94, and the fourth folding line 95. It is to be understood that the corners at each of the folding lines 92, 93, 94, and 95 are not necessarily sharp. FIG. 4D has planar first side portion 36 and planar second side portion 37 depicted in hidden line to indicate that the single sheet 65 is folded (as indicated by arrows 39 to form the closed perimeter 53. As used herein, permanently joining means joining such that the single sheet 65 would be damaged by separating the joint through application of a force to break the joint, or through a cutting process. For example, a crimped joint may form a cold weld that cannot be separated without the weld pulling parent material from one of the joined elements. The plurality of apertures 50 may be formed in the single sheet 65 prior to the folding. In an example, the plurality of apertures 50 may be stamped into the single sheet prior to the folding.

Figure 6:
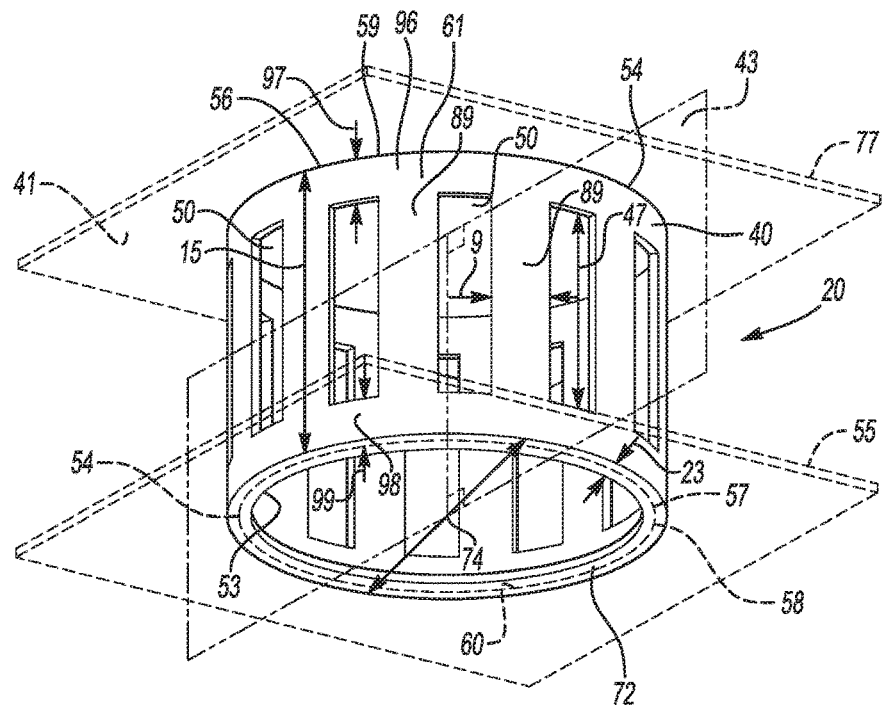
FIG. 6 is a semi-schematic, perspective view of local energy absorber having a wall defining a right circular cylinder according to the present disclosure.
Figure 7A:
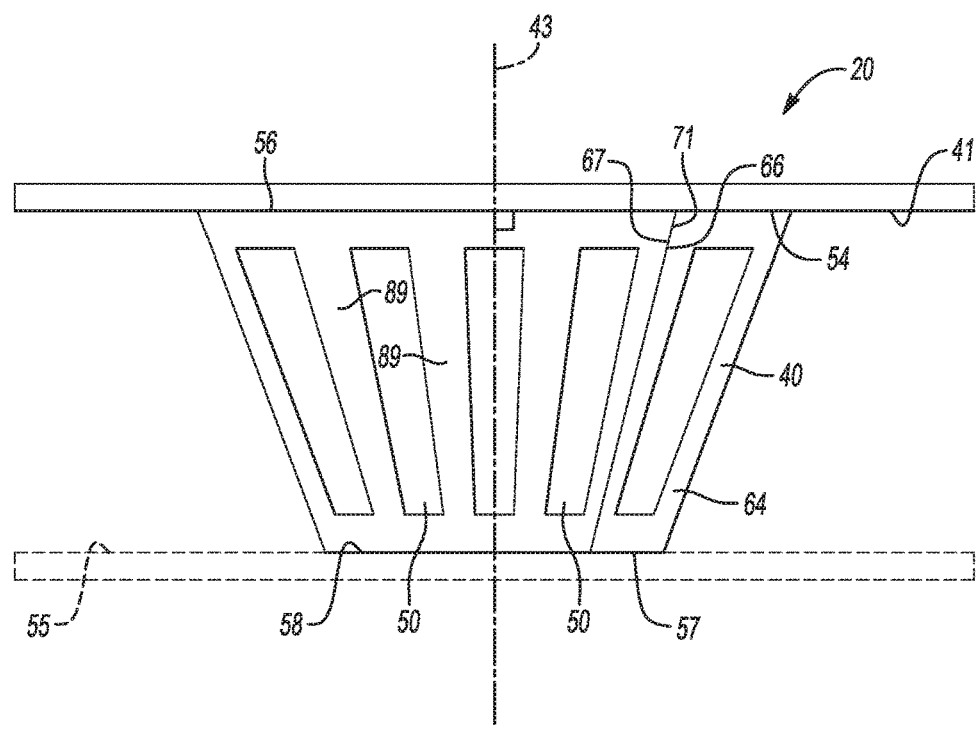
FIG. 7A is a semi-schematic side view of a local energy absorber having a wall defining a conical frustum according to the present disclosure.
Figure 7B:
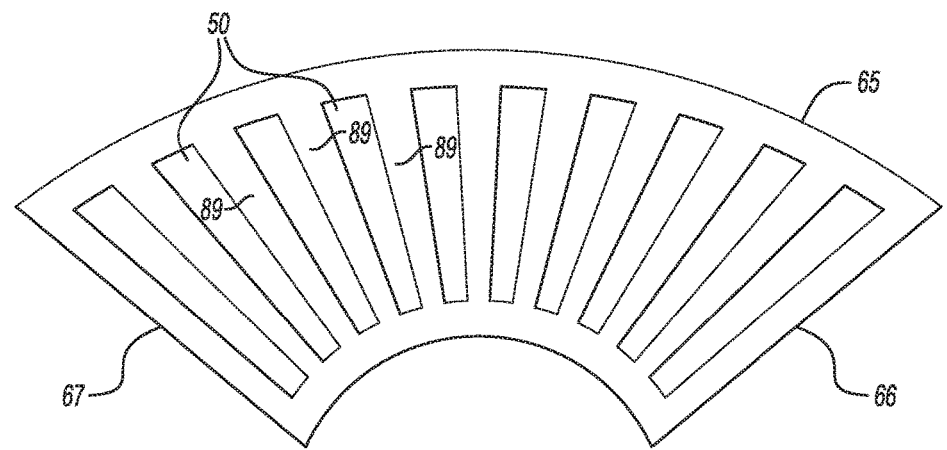
FIG. 7B is a semi-schematic plan view of a single sheet to be rolled and permanently joined to form the local energy absorber depicted in FIG. 7A.
Figure 8A:
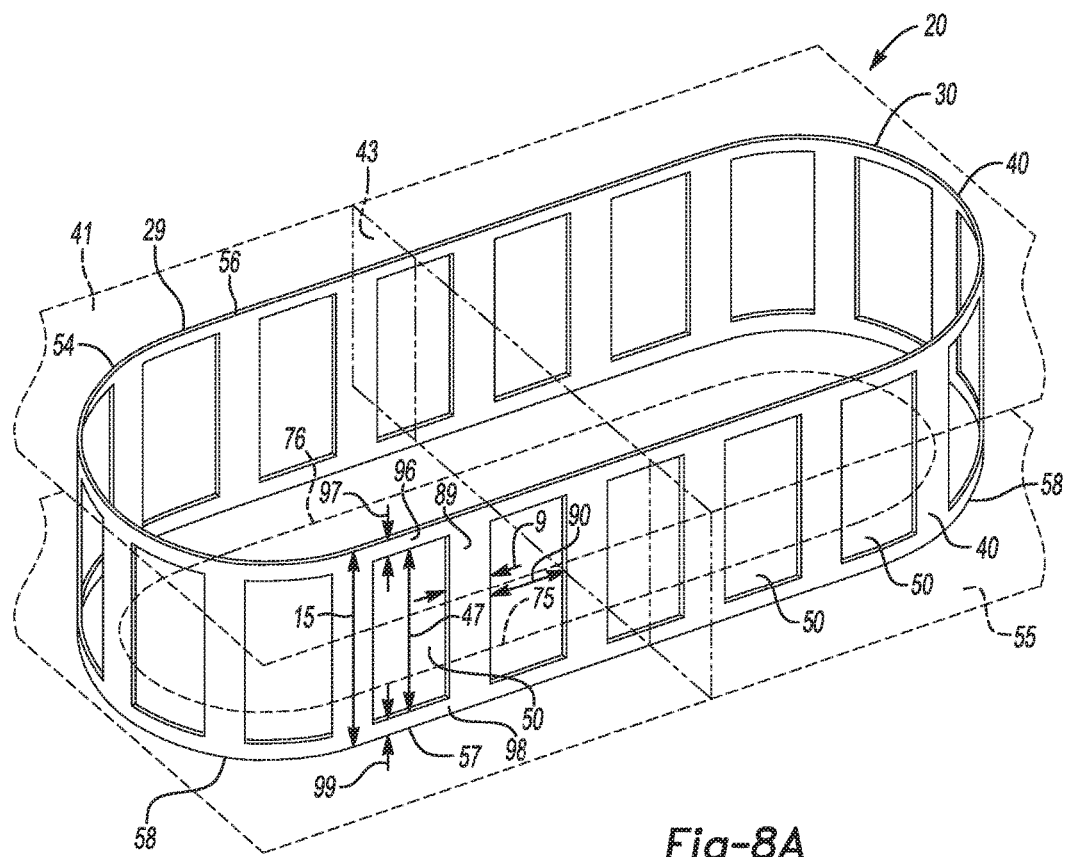
FIG. 8A is a semi-schematic perspective view of a local energy absorber having a wall defining a right stadium cylinder according to the present disclosure.

FIGS. 6, 7 and 8A depict examples of the present disclosure having a first intersection 54 of the wall 40 and a top plane 41 normal to the central plane 43. The first intersection 54 defines a first simple closed convex curve 56. A second intersection 58 of the wall 40 and a bottom plane 55 parallel to the top plane 41 defines a second simple closed convex curve 57.

As used herein, a simple curve is a curve that does not cross itself; starting and stopping points may be the same. A closed curve is a curve that starts and stops at the same point. A convex curve is a simple, closed curve with no indentations; the segment connecting any two points in the interior of the curve is wholly contained in the interior of the curve.

In the examples depicted in FIGS. 4, 6, 8A, and 8B the second simple convex curve 57 is congruent to the first simple closed convex curve 56. In the example depicted in FIG. 6, the first simple closed convex curve 56 is a circle 59, and the wall 40 defines a right circular cylinder 61. In examples depicted in FIG. 6, the diameter 74 of the circle 59 may range from about 25 mm to about 40 mm. The height 97 of the headers 96 and the height 99 of the footers 98 may range from about 2 to about 10 mm. The height 15 of the wall 40 may range from about 15 to about 40 mm. The thickness 23 of the wall 40 may range from about 1 mm to about 3 mm. The height 47 of the apertures 50 may range from about 10 mm to about 25 mm. The width 90 of the apertures 50 may range from about 1.5 mm to about 10 mm. The width 9 of the struts 89 may range from about 2.5 mm to about 7 mm.

Figure 8B:
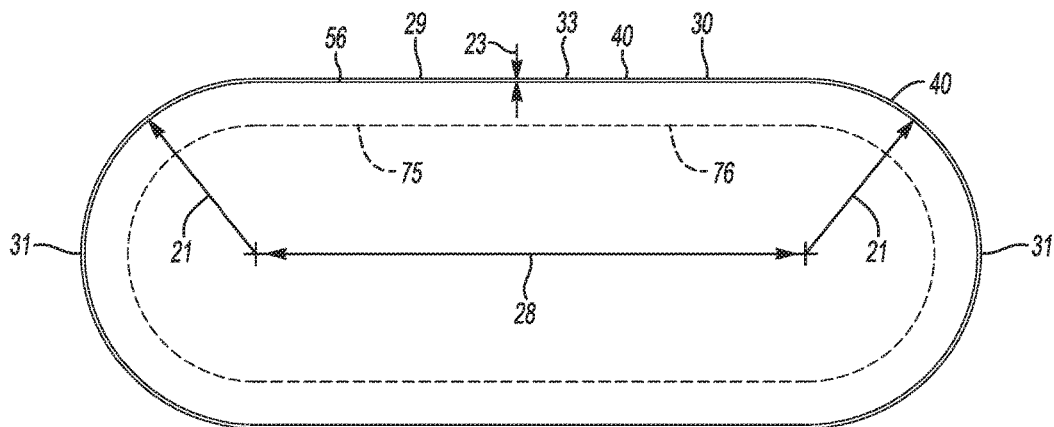
FIG. 8B is a semi-schematic top view of the local energy absorber depicted in FIG. 8A.

In the example depicted in FIGS. 8A and 8B, the first simple closed convex curve 56 is a stadium 29, and the wall 40 defines a right stadium cylinder 30. As used herein, a stadium means a geometrical oblong figure formed by joining semicircles to opposite ends of a rectangle. A right stadium cylinder is a projection of a stadium normal to the plane of the stadium. In examples depicted in FIGS. 8A and 8B, the radius 21 of the semi-circular ends 31 of the stadium 29 may range from about 10 mm to about 30 mm. The length 28 of the parallel sides 33 may range from about 40 to about 75 mm. The height 97 of the headers 96 and the height 99 of the footers 98 may range from about 2 to about 10 mm. The height 15 of the wall 40 may range from about 15 to about 40 mm. The thickness 23 of the wall 40 may range from about 1 mm to about 3 mm. The height 47 of the apertures 50 may range from about 10 mm to about 25 mm. The width 90 of the apertures 50 may range from about 5 mm to about 15 mm. The width 9 of the struts 89 may range from about 2.5 mm to about 7 mm. It is to be understood that the ranges provided herein are non-limitative examples, and therefor examples beyond the expressly disclosed ranges are also disclosed herein.

In the examples having second simple convex curve 57 congruent to the first simple closed convex curve 56, (e.g. as depicted in FIG. 4A, FIG. 6, and FIG. 8A) the local energy absorber 20 may be fabricated by extruding the wall 40 as a single extrudate through a die 44, then forming the plurality of apertures 50 in the wall 40. In an example, the local energy absorber 20 may be formed from a magnesium alloy or an aluminum alloy. The plurality of apertures 50 may be formed by machining, laser cutting, or other metal removal processes as the extrudate 45 exits the die 44 before the local energy absorber 20 is divided from the extrudate 45. In the example depicted in FIG. 4B, a first laser 51 cuts the plurality of apertures 50 into the extrudate 45. A second laser 52 divides the local energy absorber 20 from the extrudate 45.

In the examples depicted in FIG. 6, an annular flange 72 is depicted in hidden line to indicate that some examples may exclude the annular flange 72, and some examples may include the annular flange 72. The annular flange 72 is defined at the second intersection 58. In the examples including the annular flange 72, the annular flange 72 may have an inner diameter 53 smaller than a diameter 54 of an inner circle 60 defined at the second intersection 58.

In the examples depicted in FIG. 6, a top plate 77 is depicted in hidden line to indicate that some examples may exclude the top plate 77, and some examples may include the top plate 77. The top plate 77 is parallel to the top plane 41 and continuously connected to the wall 40 at the first intersection 54. For example, the top plate 77 may be continuously welded or bonded to the wall 40 at the first intersection 54.

In the example depicted in FIG. 7A, the wall 40 defines a conical frustum 64. The local energy absorber 20 may be fabricated from a single sheet 65 (see FIG. 7B) by rolling the sheet to form the conical frustum 64 then permanently joining a first edge 66 of the single sheet 65 to a second edge 67 of the single sheet 65 to form a seam 71 by crimping or welding. As stated above, permanently joining means joining such that the single sheet 65 would be damaged by separating the joint. For example, a crimped joint may form a cold weld that cannot be separated without the weld pulling parent material from one of the joined elements. In the example depicted in FIG. 7A, the plurality of apertures 50 may be formed in the single sheet 65 prior to the rolling. In an example, the plurality of apertures 50 defining the struts 89 may be stamped into the single sheet 65 prior to the rolling. In another example, the plurality of apertures 50 may be formed in the conical frustum 64 by machining or laser cutting after the joining.

In the example depicted in FIGS. 8A and 8B, the wall 40 defines a right stadium cylinder 30. An inner flange 75 is depicted in hidden line to indicate that some examples may exclude the inner flange 75, and some examples may include the inner flange 75. The inner flange 75 is defined at the second intersection 58. The inner flange 75 has an inner edge 76 defined parallel to the second intersection 58.

Figure 9A:
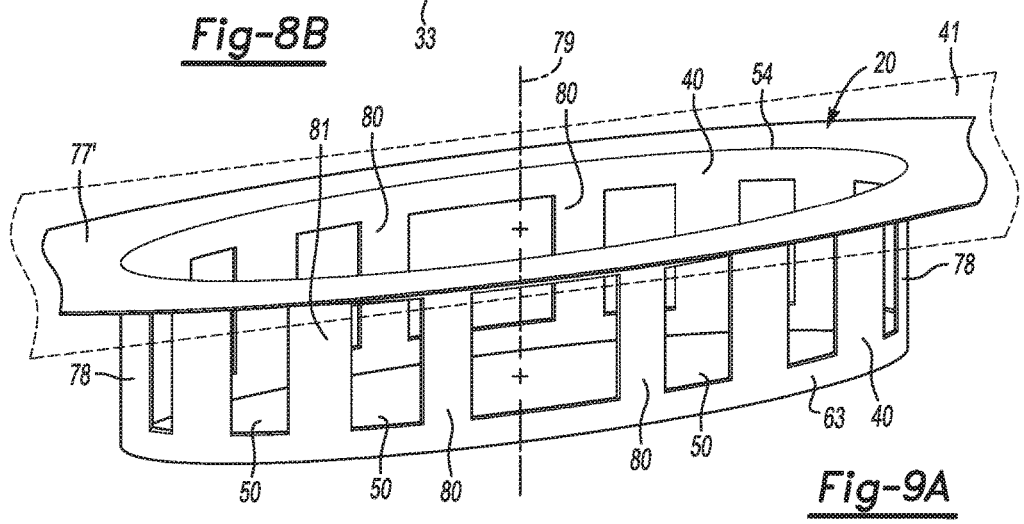
FIG. 9A is a semi-schematic perspective view depicting an example of a local energy absorber with a wall defining a right elliptical cylinder and a top flange.

FIG. 9A depicts an example of a local energy absorber 20 with the wall defining a right elliptical cylinder 63. A top flange 77' is parallel to the top plane 41 and continuously connected to the wall 40 at the first intersection 54. For example, the top flange 77' may be continuously welded to the wall 40 at the first intersection 54.

Figure 9B:
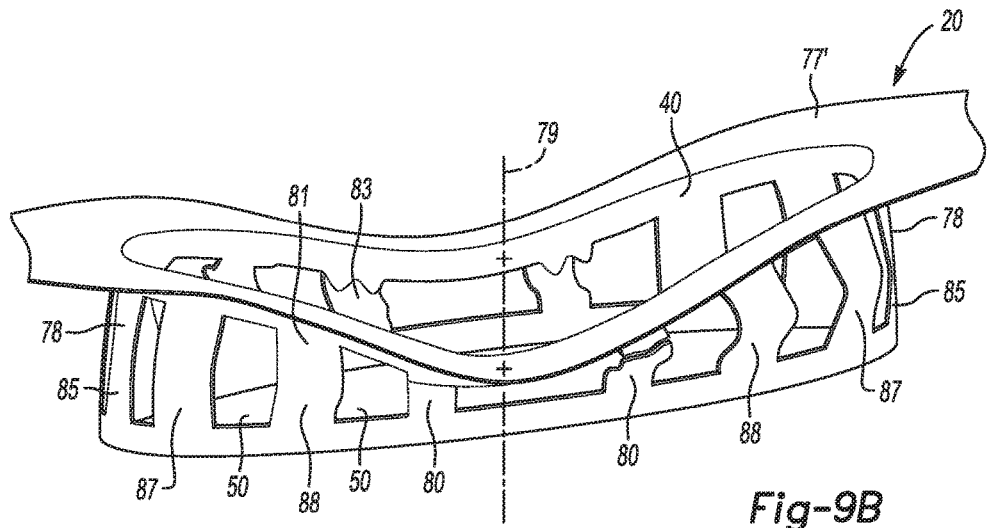
FIG. 9B is a semi-schematic perspective view depicting the example of FIG. 9A after an impact event similar to the impact event depicted in FIG. 5.

FIG. 9B depicts the example of FIG. 9A after the impact event similar to the impact event depicted in FIG. 5. The impact in FIG. 9B was centered on the local energy absorber 20. Because of the centrality of loading of the impact, the progressive deformation from the major vertices 78 to the center 79 is similar to the progression of deformation of the central struts 80 over time. The plurality of apertures 50 is defined by a plurality of struts 81 and a subset 83 of the plurality of struts 81 is to, during the impact event, deform in a sequence beginning with elastic deformation, followed by plastic deformation and buckling, followed by fracture of the subset 83 of the plurality of struts 81. As depicted in FIG. 9B, the outer struts 85 are elastically deformed since the outer struts 85 are peripheral to the impact. The second struts 87 have begun plastic deformation and buckling. The buckling of the third struts 88 is more pronounced. The central struts 80 have fractured.

Figure 10:
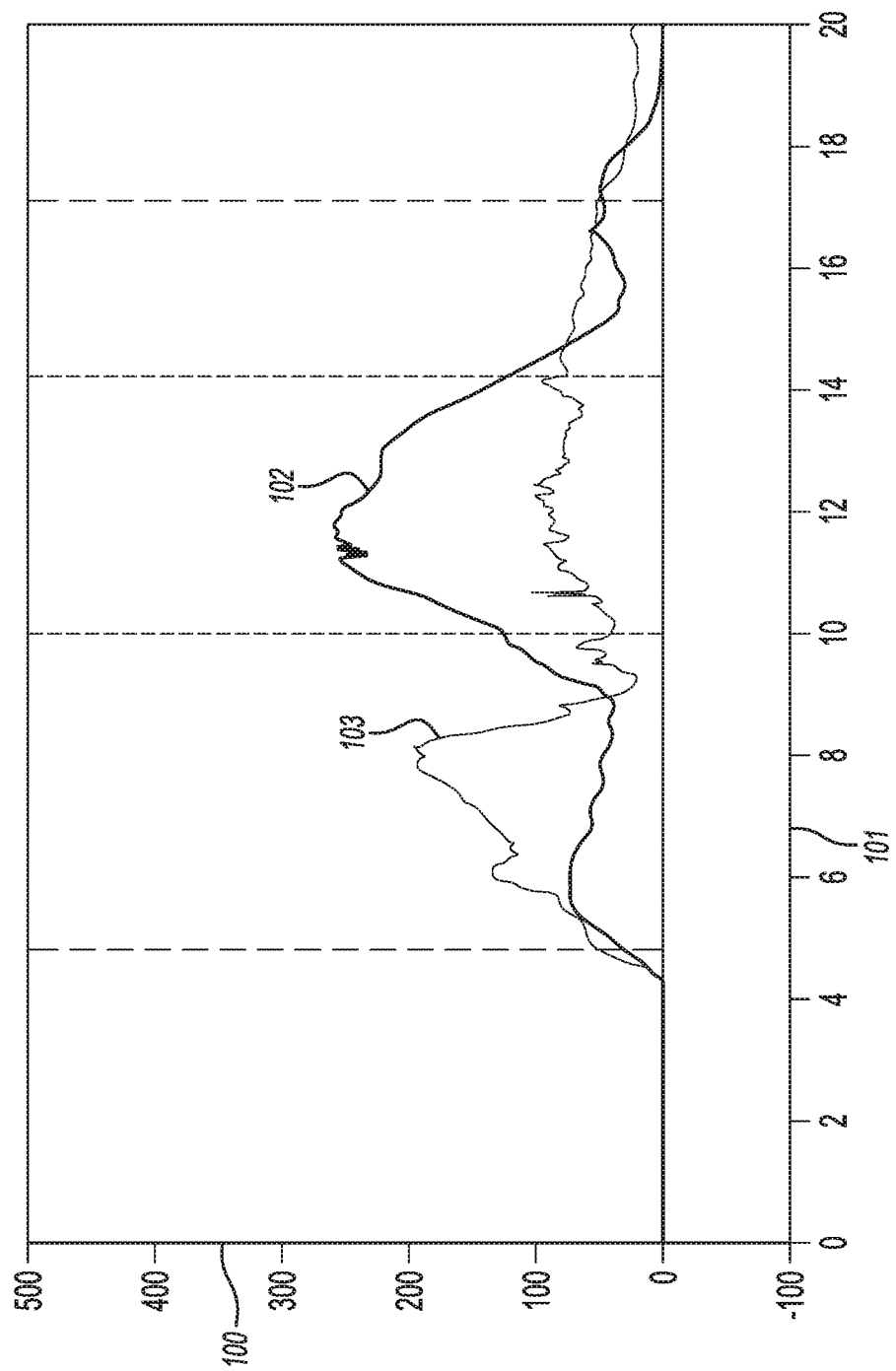
FIG. 10 is a resultant deceleration vs. time chart comparing deceleration traces associated with an impact involving a vehicle hood with and without a local energy absorber of the present disclosure.

FIG. 10 is a deceleration vs. time chart of an impact of an impacting object 25 into a vehicle hood including a local energy absorber according to the present disclosure compared with a similar impact into a hood without the local energy absorber. In FIG. 10, the horizontal axis 101 indicates time in ms, and the vertical axis 100 indicates deceleration in units of g. Without being bound to any theory, it is believed that examples of the energy absorber 20 disclosed herein allow the impact energy to be absorbed while reducing the deceleration experienced by the impacting object 25. Since the energy absorbed is directly related to the deceleration integrated over time (the area under the deceleration curve), the existing energy absorber depicted by trace 102, which begins plastic deformation at about 5.5 ms, does not absorb sufficient energy early enough in the impact to prevent the deceleration from climbing to the peak at about 12 ms. It is believed that without the energy absorber, the hood bottoms out (i.e. contacts the underhood object 14) at about 9 ms, causing the rise in deceleration as the underhood object 14 begins to elastically deform under load of the impact. The underhood object 14 is relatively stiff, producing the steep deceleration curve with respect to time. In sharp contrast, the local energy absorber 20 of the present disclosure depicted in trace 103 absorbs energy in the elastic deformation portion of the impact, (up to about 8 ms), which is earlier than in trace 102. At about 8 ms, buckling and plastic deformation begins, and the local energy absorber 20 begins to fracture. Fracturing dissipates energy from the impact. Energy continues to be absorbed by the local energy absorber 20 because buckling and plastic deformation are occurring and not all of the struts that exceed the maximum strain energy that they can absorb during the impact will fracture at the same time. The deceleration is lower than the portion of the trace 103 where the struts were elastically reacting the impact load. As a result, the peak deceleration in trace 103 associated with the local energy absorber 20 of the present disclosure is lower than the peak deceleration of the trace 102 associated with the hood without the local energy absorber 20. As disclosed herein, if the deceleration vs. time profile is less symmetrical about the peak (trace 102 is relatively symmetrical), and more skewed (trace 103 is relatively skewed) toward earlier times during the impact, evaluating Eq. 1 gives a lower result.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 3 ms to about 36 ms should be interpreted to include not only the explicitly recited limits of from about 3 ms to about 36 ms, but also to include individual values, such as 5 ms, 10 ms, 15 ms, etc., and sub-ranges, such as from about 10 ms to about 18 ms; from about 15 ms to about 19.5 ms, etc. Furthermore, when "about" is utilized to describe a value, this is meant to encompass minor variations (up to +/−5 percent) from the stated value.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A vehicle hood covering an object, comprising:
an inner surface of the vehicle hood facing the object and spaced from the object, and an outer surface of the vehicle hood opposite the inner surface; and
a local energy absorber operatively attached to the inner surface of the vehicle hood, wherein the local energy absorber is a multiply-connected structure, including:
a wall defining an interior surface having symmetry about a central plane normal to the inner surface of the vehicle hood; and
a plurality of apertures defined in the wall symmetrically about the central plane, the apertures being configured to initiate buckling and fracture in the wall during an impact applied to the outer surface of the vehicle hood defining an impact event having a duration of less than 20 milliseconds, wherein:
a first intersection of the wall and a top plane normal to the central plane defines a first simple closed convex curve; and
a second intersection of the wall and a bottom plane parallel to the top plane defines a second simple closed convex curve.

2. The vehicle hood as defined in claim 1 wherein the second simple closed convex curve is congruent to the first simple closed convex curve.

3. The vehicle hood as defined in claim 2 wherein:
the first simple closed convex curve is a circle; and
the wall defines a right circular cylinder.

4. The vehicle hood as defined in claim 2 wherein:
the first simple closed convex curve is an ellipse or a stadium; and
the wall defines a right elliptical cylinder or a right stadium cylinder.

5. The vehicle hood as defined in claim 2 wherein the local energy absorber is fabricated by extruding the wall as a single extrudate through a die, then forming the plurality of apertures in the wall.

6. The vehicle hood as defined in claim 5 wherein the plurality of apertures are formed by machining or laser cutting as the extrudate exits the die before the local energy absorber is divided from the extrudate.

7. The vehicle hood as defined in claim 1, wherein the local energy absorber is fabricated from a single sheet by rolling the sheet to form a conical frustum then permanently joining a first edge of the single sheet to a second edge of the single sheet to form a seam by crimping or welding.

8. The vehicle hood as defined in claim 7 wherein the plurality of apertures is formed in the single sheet prior to the rolling.

9. The vehicle hood as defined in claim 2, wherein the local energy absorber is fabricated from a single sheet by rolling the sheet to form a closed perimeter then joining a first edge of the single sheet to a second edge of the single sheet to form a seam by crimping or welding.

10. The vehicle hood as defined in claim 9 wherein the plurality of apertures is formed in the single sheet prior to the rolling.

11. The vehicle hood as defined in claim 3 wherein an annular flange is defined at the second intersection, the annular flange having an inner diameter smaller than a diameter of an inner circle defined at the second intersection.

12. The vehicle hood as defined in claim 4 wherein a flange is defined at the second intersection, the flange having an inner edge defined parallel to the second intersection.

13. The vehicle hood as defined in claim 2 wherein a top plate is parallel to the top plane and continuously connected to the wall at the first intersection.

14. The vehicle hood as defined in claim 5 wherein the local energy absorber is formed from a magnesium alloy.

* * * * *